(12) United States Patent
Imai et al.

(10) Patent No.: US 9,625,771 B2
(45) Date of Patent: Apr. 18, 2017

(54) DISPLAY DEVICE

(71) Applicant: Japan Display Inc., Tokyo (JP)

(72) Inventors: Ryo Imai, Tokyo (JP); Gou Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 139 days.

(21) Appl. No.: 14/094,936

(22) Filed: Dec. 3, 2013

(65) Prior Publication Data

US 2014/0152929 A1 Jun. 5, 2014

(30) Foreign Application Priority Data

Dec. 3, 2012 (JP) ................................. 2012-264112

(51) Int. Cl.
  *G09G 5/02* (2006.01)
  *G02F 1/1343* (2006.01)
  *G09G 3/36* (2006.01)

(52) U.S. Cl.
  CPC ..... *G02F 1/134336* (2013.01); *G09G 3/3611* (2013.01); *G09G 3/3648* (2013.01); *G09G 2300/0452* (2013.01); *G09G 2300/0465* (2013.01); *G09G 2320/0233* (2013.01); *G09G 2320/0247* (2013.01)

(58) Field of Classification Search
  CPC ........ G02F 2001/136222; G02F 2001/134345; G09G 3/3611; G09G 3/3648; G09G 2300/0452; G09G 2300/0465; G09G 2320/0247; G09G 2320/0233
  USPC ..... 345/694, 695, 92, 94, 100; 349/106–109
  See application file for complete search history.

(56) References Cited

U.S. PATENT DOCUMENTS

| 6,365,916 B1 * | 4/2002 | Zhong | G02F 1/136213 257/59 |
| 7,180,560 B2 * | 2/2007 | Chuang | G02F 1/133555 349/106 |
| 8,842,063 B2 * | 9/2014 | Hou | G09G 3/3648 345/94 |

(Continued)

FOREIGN PATENT DOCUMENTS

| EP | 0560272 A2 | 9/1993 |
| JP | 2002-287712 A | 10/2002 |

(Continued)

OTHER PUBLICATIONS

Japanese Office Action dated Aug. 30, 2016 for corresponding Japanese Application No. 2012-264112 with partial translation.

(Continued)

*Primary Examiner* — Jimmy H Nguyen
(74) *Attorney, Agent, or Firm* — Typha IP LLC (57) ABSTRACT

Pixel electrodes of a display device include plural first pixel electrodes and plural second pixel electrodes which have areas different from each other. Each of plural scanning signal lines is connected with any one of the plural first pixel electrodes and the plural second pixel electrodes through respective transistors. A control circuit applies a first conducting voltage that is a conducting voltage which is applied to the scanning signal lines connected with the first pixel electrodes, and a second conducting voltage that is a conducting voltage which is applied to the scanning signal lines connected with the second pixel electrodes, and different from the first conducting voltage.

10 Claims, 7 Drawing Sheets

(56) References Cited

U.S. PATENT DOCUMENTS

2011/0187953 A1    8/2011    Hiyama et al.

FOREIGN PATENT DOCUMENTS

| JP | 2011-158563 | 8/2011 |
| WO | 2011/083784 A1 | 7/2011 |

OTHER PUBLICATIONS

Chinese Office Action dated Aug. 22, 2016 for corresponding Chinese Application No. 201310636637.5.

* cited by examiner

DISPLAY DEVICE

CROSS-REFERENCE TO RELATED APPLICATION

The present application claims priority from Japanese application JP2012-264112 filed on Dec. 3, 2012, the content of which is hereby incorporated by reference into this application.

BACKGROUND OF THE INVENTION

1. Field of the Invention

The present invention relates to a display device.

2. Description of the Related Art

Display devices have been popularly used in information communication terminals and television receivers. The liquid crystal display device, which is one of those display devices, displays an image by changing an electric field to change an orientation of a liquid crystal composition confined between two glass substrates so as to control an intensity of a light that passes through a liquid crystal panel. On the other hand, an organic EL (Electro-Luminescent) display device which is another display device is designed to use a self-luminous element such as an organic light emitting diode.

JP 2011-158563 A discloses a liquid crystal display device in which an aperture ratio is different for each of colors to efficiently obtain a luminance.

SUMMARY OF THE INVENTION

In the display devices having a transistor for applying a given potential to respective pixels, such as the liquid crystal display device or the organic EL display device, a potential of an electrode applied from a source/drain line is changed at the same time according to a change in a gate signal when writing video signal voltages to the respective pixels. In particular, as disclosed in the above-mentioned JP 2011-158563 A, if the aperture ratio is different depending on the pixels, because a size of pixel electrodes is different depending on the aperture ratio, a change in the potential of the pixel electrode corresponding to a change in the gate signal is also different for each of the pixels, resultantly it has a possibility of display defect such as flicker.

The present invention has been made in view of the above-mentioned circumstances, and therefore aims at providing a display device that suppresses display defect caused by a change in the potential of the pixel electrode corresponding to a change in the gate signal even if an area of pixel electrodes is different depending on the pixels.

According to the present invention, there is provided a display device, including: a plurality of scanning signal lines that extends in one direction and is arranged in parallel in a display area of a substrate; transistors that are arranged for each of pixels along each of the plurality of scanning signal lines, and respectively have gates connected to the scanning signal lines; pixel electrodes to each of which a potential corresponding to a grayscale value of each of the pixels is applied through each of the transistors, by applying a conducting voltage for rendering each of the transistors conductive to the scanning signal line; and a control circuit that applies the conducting voltage, in which the pixel electrodes include a plurality of first pixel electrodes and a plurality of second pixel electrodes which have different areas from each other in a plan view from a direction perpendicular to a surface of the substrate, in which each of the plurality of scanning signal lines is connected with only any one of the plurality of first pixel electrodes and the plurality of second pixel electrodes through each of the transistors, and in which the control circuit applies a first conducting voltage that is the conducting voltage which is applied to the scanning signal lines connected with the first pixel electrodes, and a second conducting voltage, which is different from the first conducting voltage, that is the conducting voltage which is applied to the scanning signal lines connected with the second pixel electrodes.

Also, in the display device according to the present invention, when an area of the second pixel electrodes is larger than an area of the first pixel electrodes, a potential difference of the second conducting voltage can be made larger than a potential difference of the first conducting voltage.

Also, in the display device according to the present invention, the first pixel electrodes are pixel electrodes that control lights for red wavelength range and green wavelength range, the second pixel electrodes are pixel electrodes that control lights for blue wavelength range and white wavelength range, the pixel electrodes that control the lights for the blue wavelength range and white wavelength range are alternately arrayed on the same scanning signal lines, and the area of the second pixel electrodes can be made larger than the area of the first pixel electrodes.

Also, in the display device according to the present invention, a counter electrode may function as a common electrode that forms an electric field in cooperation with the pixel electrodes, and covers an overall area of the display area.

DETAILED DESCRIPTION OF THE INVENTION

Embodiment

An embodiment of the present invention will be described with reference to the accompanying drawings. In the drawings, the same or equivalent elements are denoted by identical symbols, and a repetitive description will be omitted.

Figure 1:
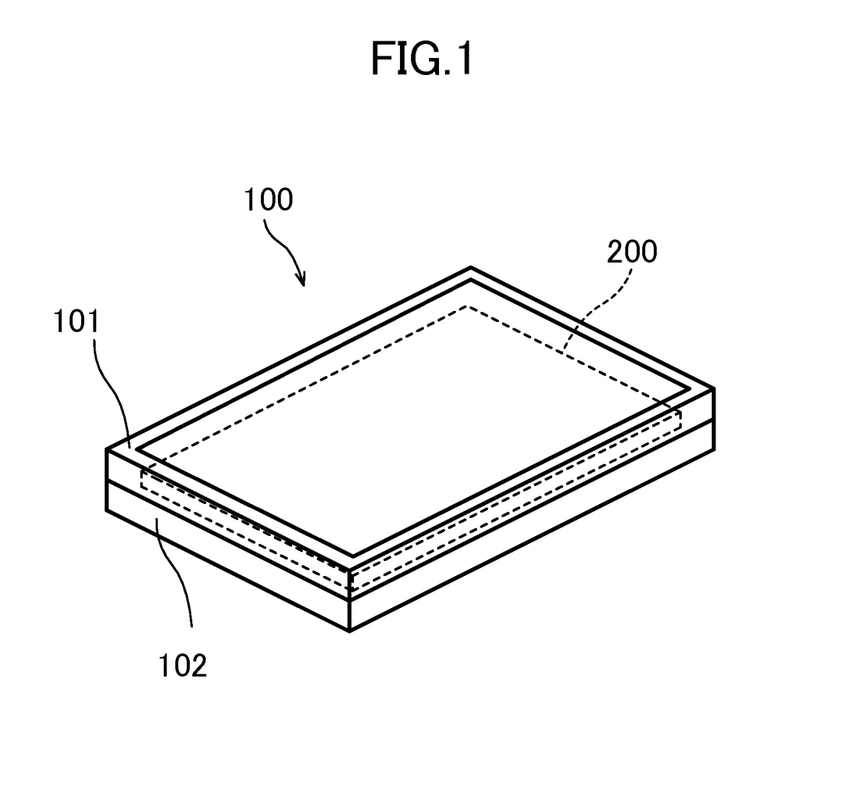
FIG. 1 is a diagram schematically illustrating a liquid crystal display device which is a display device according to an embodiment of the present invention.

FIG. 1 is a diagram schematically illustrating a liquid crystal display device 100 which is a display device according to an embodiment of the present invention. As illustrated in this drawing, the liquid crystal display device 100 includes a liquid crystal panel 200 fixed to be sandwiched between an upper frame 110 and a lower frame 120, and a backlight device not shown.

Figure 2:
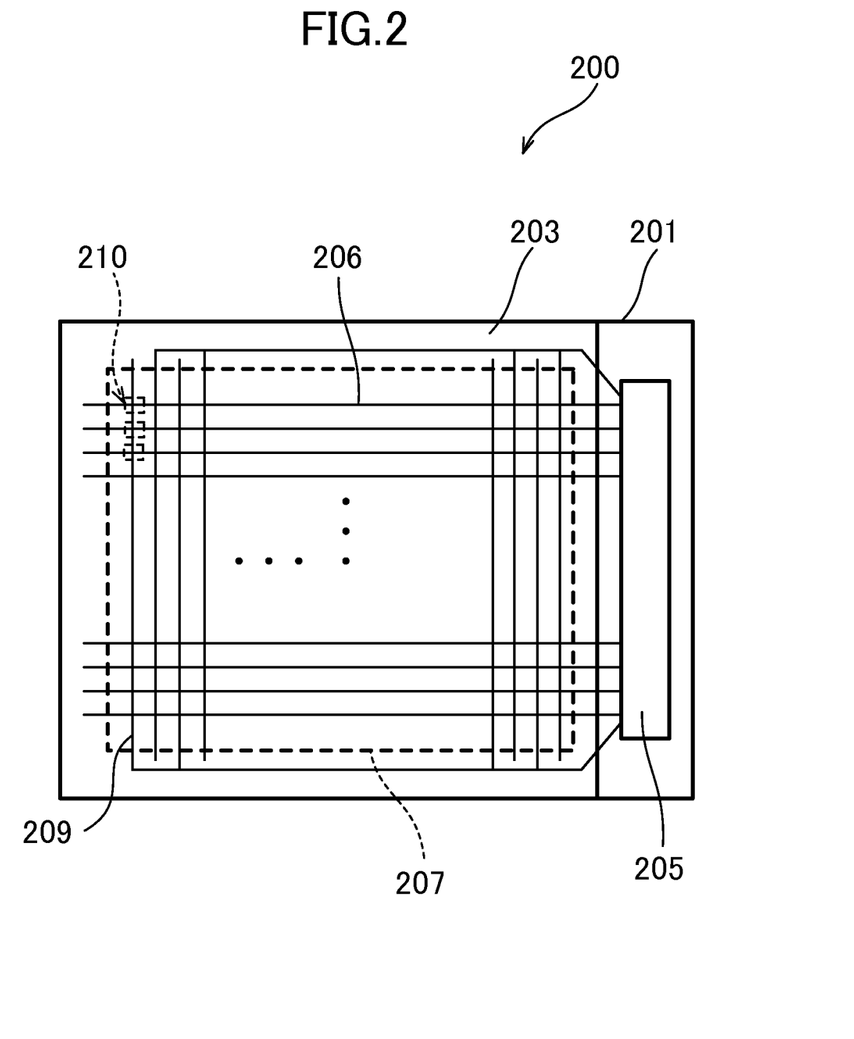
FIG. 2 is a diagram schematically illustrating a liquid crystal panel in FIG. 1.

FIG. 2 is a diagram schematically illustrating the liquid crystal panel 200 in FIG. 1. As illustrated in this drawing, the liquid crystal panel 200 includes a thin film transistor substrate 201 which is an insulating substrate on which transistors are formed, a color filter substrate 203 that is placed on the thin film transistor substrate 201 to seal a liquid crystal composition (not shown) in cooperation with the thin film transistor substrate 201, in which filters that transmit only a light of a wavelength corresponding to any one of RGBW (red, green, blue, white) by respective pixels 210 formed in a display area 207 are formed, a plurality of scanning signal lines 206 that is connected to gates of the transistors arranged in the respective pixels 210, extended in one direction and arrayed in parallel, a plurality of drain lines 209 that is connected to drains of the transistors, extended in a direction orthogonal to the scanning signal lines 206, and arranged in parallel, and a driver IC (integrated circuit) that is a control circuit that controls a voltage to be applied to the scanning signal lines 206, and a voltage to be applied to the drain lines 209 to apply a voltage corresponding to a grayscale value to the respective pixels 210.

Figure 3:
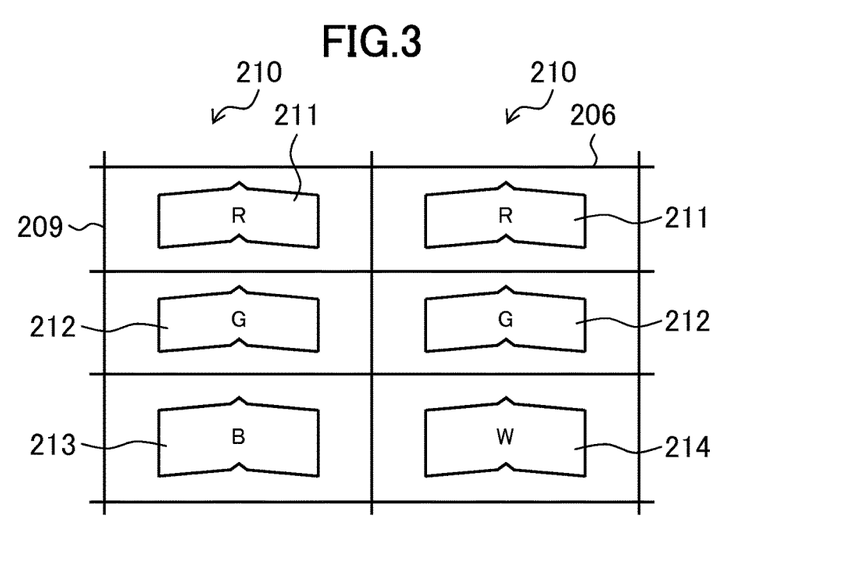
FIG. 3 is a diagram schematically illustrating sub-pixels of pixels in the liquid crystal panel of FIG. 2.

FIG. 3 is a diagram schematically illustrating sub-pixels of the pixels 210 in the liquid crystal panel 200 of FIG. 2. The pixels have two types of pixels corresponding to colors of RGB, and pixels corresponding to colors of RGW. As illustrated in FIG. 3, an R pixel electrode 211, a G pixel electrode 212, and a B pixel electrode 213 as well as the R pixel electrode 211, the G pixel electrode 212, and a W pixel electrode 214 are provided in correspondence with the respective pixels. There are formed two types of a row in which the R pixel electrode 211, the G pixel electrode 212, and the B pixel electrode 213 are arrayed, and a row in which the R pixel electrode 211, the G pixel electrode 212, and the W pixel electrode 214 are arrayed, in the stated order along the drain lines 209. Also, there are formed a row in which only the R pixel electrodes 211 are arrayed, a row in which only the G pixel electrodes 212 are arrayed, and a row in which the B pixel electrodes 213 and the W pixel electrodes 214 are alternately arrayed, along the scanning signal lines 206.

In this example, areas of the B pixel electrode 213 and the W pixel electrode 214 (an area of the second pixel electrodes) are larger than areas of the R pixel electrode 211 and the G pixel electrode 212 (an area of the first pixel electrodes). In this embodiment, the areas of the B pixel electrode 213 and the W pixel electrode 214 are larger than the areas of the R pixel electrode 211 and the G pixel electrode 212 by about 20%. Alternatively, the sizes of the respective pixel electrodes may be different at another ratio. In this example, the reason that the area of W (white) is larger is because the luminance is more increased to suppress the power consumption, and a contrast is improved. Further, in order to prevent the chromaticity of blue from becoming short, the area of the B pixel electrode 213 is also increased together with the area of the W pixel electrode 214. Also, the sub-pixels of RGB or RGW are arranged for one drain line, to thereby reduce the number of drain lines 209 and suppress the power consumption.

Figure 4:
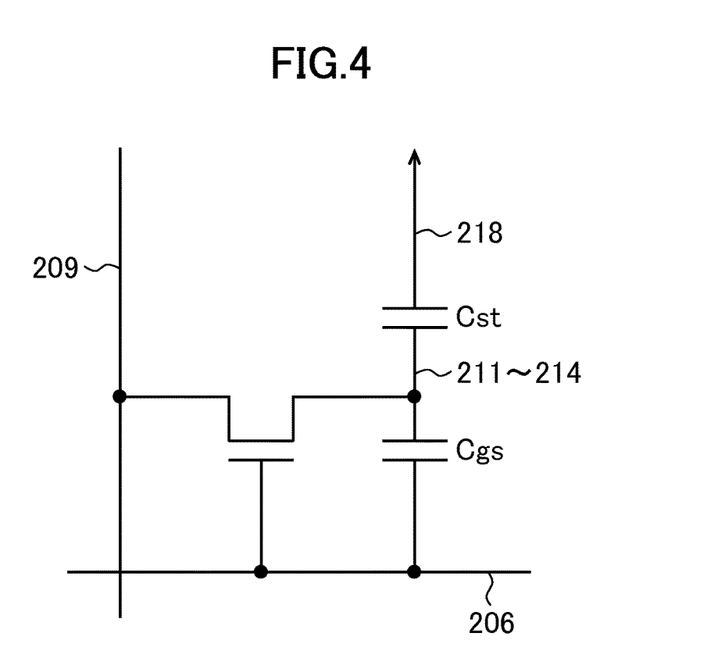
FIG. 4 is a diagram illustrating capacitors formed in the respective sub-pixels.

Now, a voltage drop across the pixel electrode when the gate signal to be supplied to the scanning signal lines 206 falls will be described. FIG. 4 is a diagram illustrating capacitors formed in the respective sub-pixels. As illustrated in FIG. 4, a grayscale signal voltage applied to the drain lines 209 is held by any one of the pixel electrodes 211 to 214 by falling of the gate signal to be supplied to the scanning signal lines 206. On the other hand, the pixel electrodes each form a capacitor Cgs in cooperation with the scanning signal line 206. Also, a common electrode 218 is formed by a transparent electrode that covers the overall display area 207, which is a counter electrode that holds a constant voltage to control an orientation of a liquid crystal composition in cooperation with the pixel electrodes. The pixel electrodes each form a capacitor Cst in cooperation with the common electrode 218. If a falling potential difference ΔVg of the gate signal is generated with the formation of those capacitors Cgs and Cst, a drop voltage ΔVp is generated in the pixel electrodes as represented by the following Expression 1.

$$\Delta Vp = Cgs/(Cst+Cgs) \times \Delta Vg \qquad (\text{EX. 1})$$

Figure 5:
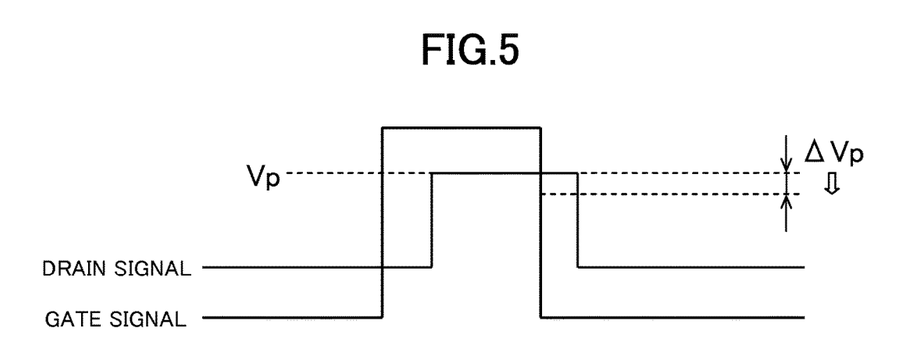
FIG. 5 is a timing chart illustrating a voltage drop of pixel electrodes when a positive electrode potential from a voltage applied to a common electrode is applied to the pixel electrodes.
Figure 6:
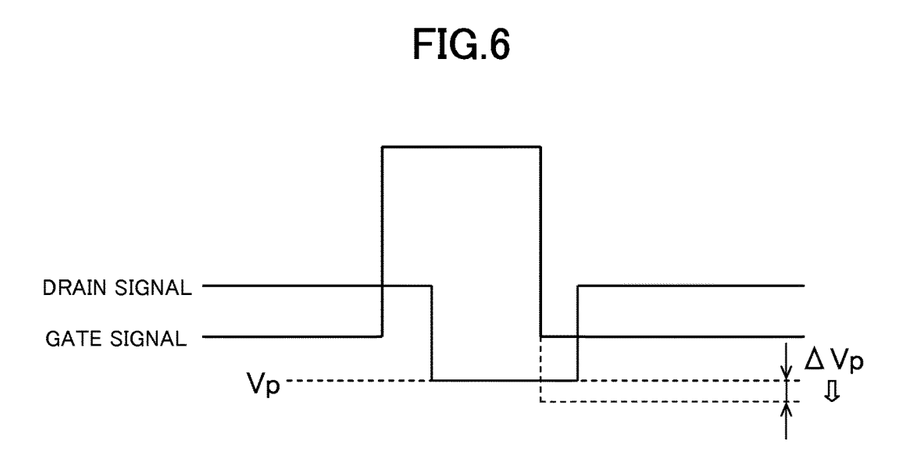
FIG. 6 is a timing chart illustrating a voltage drop of pixel electrodes when a negative electrode potential from a voltage applied to a common electrode is applied to the pixel electrodes.

FIG. 5 is a timing chart illustrating a voltage drop of pixel electrodes when a positive electrode potential is applied to the pixel electrodes by a voltage applied to the common electrode 218. As illustrated in FIG. 5, Vp applied to the pixel electrodes is reduced by ΔVp when the gate signal falls. FIG. 6 is a timing chart illustrating a voltage drop of the pixel electrodes when a negative electrode potential is applied to the pixel electrodes by the voltage applied to the common electrode 218. Similarly, in this case, as in FIG. 5, Vp applied to the pixel electrodes is reduced by ΔVp when the gate signal falls.

Taking a fact that an image display is conducted by inversion driving where the positive electrode voltage and the negative electrode voltage illustrated in FIGS. 5 and 6 are cyclically applied into account, a potential of the common electrode 218 needs to be determined so that a potential difference from the potential of the common electrode 218 becomes a desired potential difference even if those voltage drops are generated in the same pixel. However, in the liquid crystal display device 100 of this embodiment, the areas of the B pixel electrode 213 and the W pixel electrode 214 are larger than the areas of the R pixel electrode 211 and the G pixel electrode 212, and the capacitor Cst of Expression 1 is proportional to those areas. Therefore, the potential difference ΔVp of the voltage drop is not uniform. If the potential difference ΔVp cannot be uniformed, because a constant potential of the common electrode 218 cannot be determined, a flicker occurs in the display image.

Under the circumstances, in this embodiment, as illustrated in FIG. 3, since the pixels of a uniform area are aligned along the scanning signal lines 206, the gate conducting voltage which is the conducting voltage of the gates to be applied to the scanning signal lines 206 is made different between the B pixel electrode 213, the W pixel electrode 214, the R pixel electrode 211, and the G pixel electrode 212, to hold the voltage applied to the common electrode 218 constant.

Figure 7:
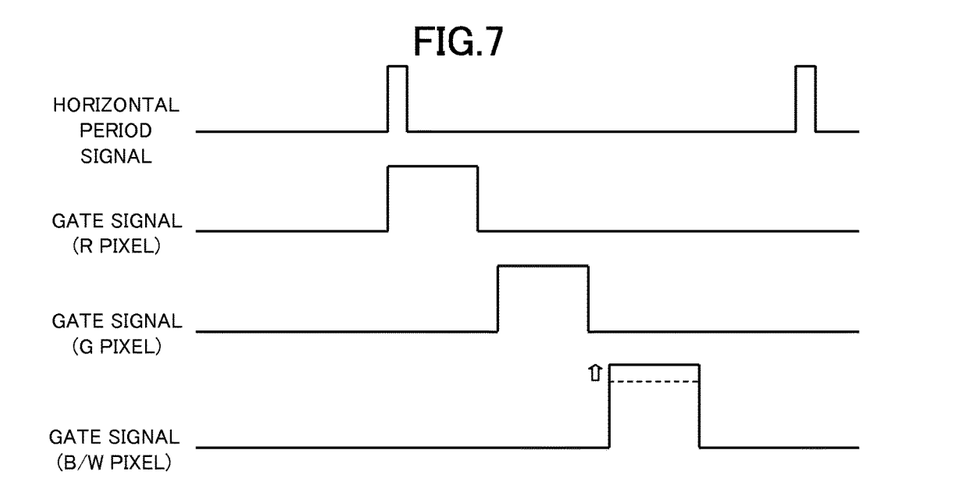
FIG. 7 is a timing chart when gate conducting voltages to be applied to scanning signal lines extended to a B pixel electrode and a W pixel electrode are increased more than the gate conducting voltages across an R pixel electrode and a G pixel electrode.

FIG. 7 is a timing chart when the gate conducting voltages to be applied to the scanning signal lines 206 extended to the B pixel electrode 213 and the W pixel electrode 214 are increased more than the gate conducting voltages to the R pixel electrode 211 and the G pixel electrode 212. As a result, the drop voltage $\Delta Vp$ when the gate signal falls can be uniformed in all of the pixel electrodes, that is, the R pixel electrode 211, the G pixel electrode 212, the B pixel electrode 213, and the W pixel electrode 214. Therefore, because one potential of the common electrode 218 can be determined, the flicker of the screen is suppressed, and the stable image can be displayed.

Figure 8:
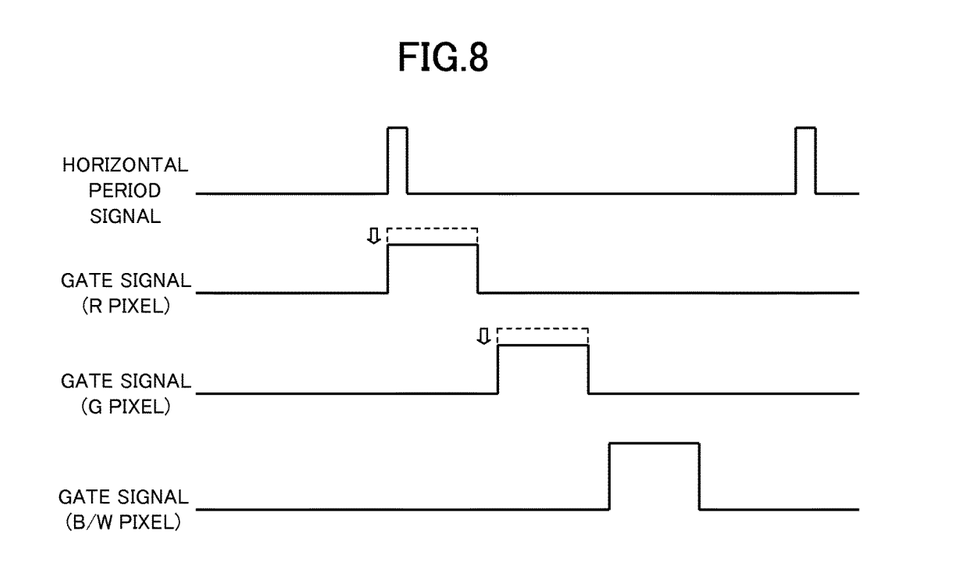
FIG. 8 is a timing chart when the gate conducting voltages to be applied to the scanning signal lines extended to the R pixel electrode and the G pixel electrode are decreased less than the gate conducting voltages across the B pixel electrode and the W pixel electrode.

FIG. 8 is a timing chart when the gate conducting voltages to be applied to the scanning signal lines 206 extended to the R pixel electrode 211 and the G pixel electrode 212 are decreased more than the gate conducting voltages to the B pixel electrode 213 and the W pixel electrode 214. Even in this case, the drop voltage $\Delta Vp$ across the respective pixel electrodes when the gate signal falls can be uniformed, and as in FIG. 7, one potential of the common electrode 218 can be determined. Therefore, the flicker of the screen is suppressed, and the stable image can be displayed.

Figure 9:
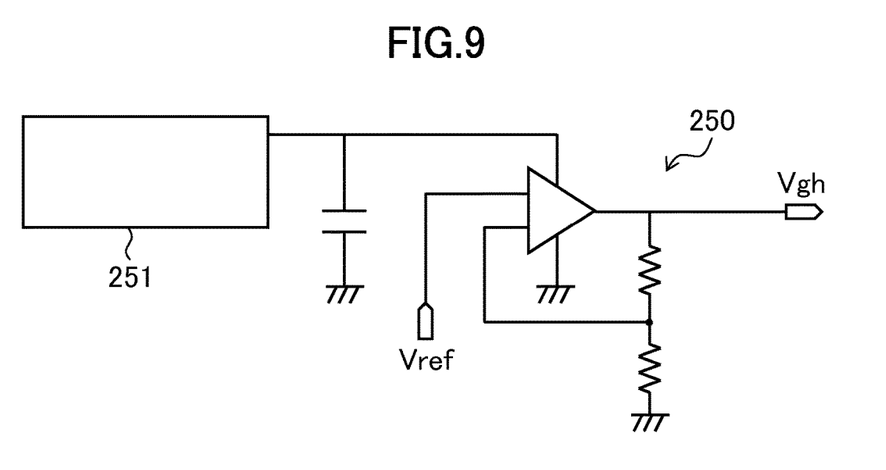
FIG. 9 is a diagram illustrating an example of a circuit for generating the gate conducting voltage to be applied to the scanning signal lines.

FIG. 9 is a diagram illustrating an example of a circuit 250 for generating the gate conducting voltage to be applied to the scanning signal lines. As illustrated in the circuit of FIG. 9, a known charge pump circuit 251 is used to switch a reference voltage Vref so that a gate conducting voltage Vgh can be switched.

Comparative Example 1

Figure 10:
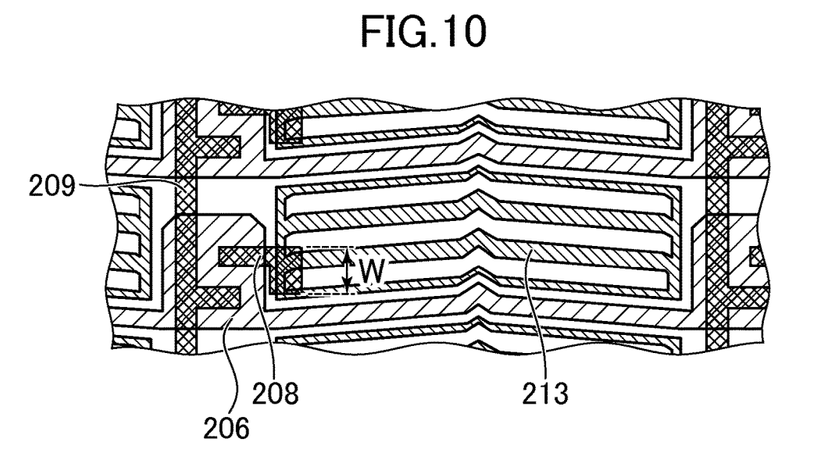
FIG. 10 is a diagram illustrating a layout of the R pixel electrode (or G pixel electrode) according to a comparison example 1.
Figure 11:
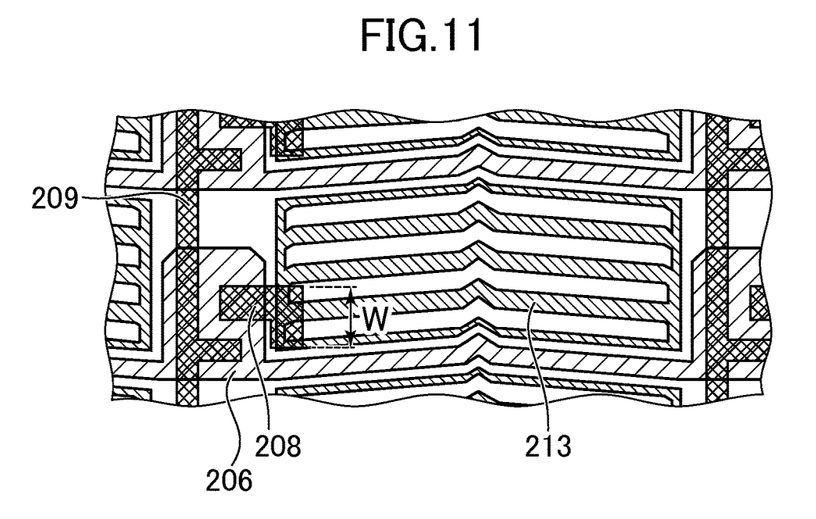
FIG. 11 is a diagram illustrating a layout of the B pixel electrode (or W pixel electrode) according to the comparison example 1.

A comparative example 1 which is another embodiment for holding $\Delta Vp$ of Expression 1 constant when the sizes of the pixel electrodes are different from each other will be described. FIG. 10 illustrates a layout of the R pixel electrode 211 (or G pixel electrode 212). FIG. 10 illustrates source lines 208 each electrically connecting the drain line 209 and the R pixel electrode 211 when the gate signal is a gate conducting voltage, and in this comparative example, a width W is set to 7.5 μm. FIG. 11 illustrates the layout of the B pixel electrode 213 (or W pixel electrode 214). In this example, the width W of the source line 208 is set to 9.0 μm. In this way, when the width W of the source lines 208 of the B pixel electrode 213 which is a larger pixel electrode is set to be larger than the width W of the source lines 208 of the R pixel electrode 211 which is a smaller pixel electrode, Cgs/(Cst+Cgs) of the above Expression 1 can be adjusted. For that reason, $\Delta Vp$ can be uniformed in the respective sub-pixels. However, in this method, there is a risk that it is difficult to uniform Cgs/(Cst+Cgs) due to manufacturing variation, in addition to a concern about the generation of a leak current.

Comparative Example 2

In the above-mentioned embodiment, the voltage applied to the scanning signal lines 206 is adjusted. Alternatively, a potential of the pixel electrodes when the voltage drops may be adjusted by adjusting the image signal to be applied to the drain lines. In this case, a grayscale signal voltage corresponding to the drop voltage $\Delta Vp$ is applied to the drain lines 209 in advance, in addition to the voltage of the image signal based on the grayscale value, and a difference in the drop voltage $\Delta Vp$ is allowed, and the grayscale signal voltage is applied to the drain lines 209. Therefore, even in this case, one potential of the common electrode 218 can be determined. In particular, this configuration is effective when the RGB is aligned in order along the scanning signal lines 206, and the pixels of the same color or the pixels of the same size are aligned along the drain lines 209. However, complicated processing is required.

In the above-mentioned embodiment, the liquid crystal display device is used as the display device, but the present invention can be applied to any display devices such as the organic EL display device in which the potential is applied with the use of the transistor arranged in each of the pixels.

Also, in this embodiment, n-type transistors are used for the pixels. Alternatively, p-type transistors can be used. In this case, terms of the sources and drains are read conversely, and the falling of the gate signal can replaced with rising of the gate signal for application.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
a plurality of scanning signal lines that extends in one direction and is arranged in parallel in a display area of a substrate;
transistors that are arranged for each of pixels along each of the plurality of scanning signal lines, and respectively have gates connected to the scanning signal lines, wherein the transistors include first transistors and second transistors;
pixel electrodes to each of which a potential corresponding to a grayscale value of each of pixels is applied through each of the transistors, when a conducting voltage of the gate for rendering each of the transistors conductive state is applied to the scanning signal line; and
a control circuit that applies the conducting voltage,
wherein the pixel electrodes include a plurality of first pixel electrodes of first type electrodes and second type electrodes, and a plurality of second pixel and each of the plurality of second pixel electrodes has an area larger than an area of each of the plurality of first pixel electrodes in a plan view from a direction perpendicular to a surface of the substrate,
wherein the plurality of scanning signal lines include a first scanning signal line connected with only the gates of the first transistors connected with the first type pixel electrodes of the first pixel electrodes, a second scanning signal line connected with only the gates of the first transistors connected with the second type pixel electrodes, being different from the first type pixel electrodes, of the first pixel electrodes, and a third scanning signal line connected with only the gates of the second transistors connected with the second pixel electrodes,
wherein a first conducting voltage is applied to the first scanning signal line and the second scanning signal line, and
wherein a second conducting voltage, which is larger than the first conducting voltage, is applied to the third scanning lines.

2. The display device according to claim 1,
wherein the first type pixel electrodes are red pixel electrodes on which filters that transmit only red light are formed and the second type pixel electrodes are green pixel electrodes on which filters that transmit only green light are formed,
wherein the second pixel electrodes are blue pixel electrodes on which filters that transmit only blue light are formed and white pixel electrodes on which filters that transmit white light are formed, and
wherein the blue pixel electrodes and the white pixel electrodes are alternately arrayed on the same scanning signal lines, and the area of one of the second pixel electrodes is larger than the area of one of the first pixel electrodes.

3. The display device according to claim 1,
wherein a counter electrode comprises a common electrode that holds a constant voltage to control an orientation of a liquid crystal composition in cooperation with the pixel electrodes, and covers an overall area of the display area.

4. A display device comprising:
a substrate;
a plurality of scanning signal lines that is formed on the substrate;
a plurality of pixels that is arranged along the scanning signal lines;
transistors each having a gate connected to one of the scanning signal lines, wherein the transistors include first transistors and second transistors;
a driver circuit that applies a scanning signal to the scanning signal lines; and
pixel electrodes, each of which is disposed for each of the pixels, and electrically connected to each of the transistors,
wherein the pixel electrodes include first pixel electrodes of first type pixel electrodes and second type pixel electrodes, and second pixel electrodes, and second pixel electrodes are larger in area than the first pixel electrodes,
wherein the scanning signal lines include a first scanning signal line, a second scanning signal line, and a third scanning signal line,
wherein the first scanning signal line forms first capacitors in cooperation with the first type pixel electrodes,
wherein the second scanning signal line forms second capacitors in cooperation with the second type pixel electrodes,
wherein the third scanning signal line forms third capacitors in cooperation with the second pixel electrodes,
wherein the first scanning signal line connected with only the gates of the first transistors connected with the first type pixel electrodes of the first pixel electrodes, the second scanning signal line connected with only the gates of the first transistors connected with the second type pixel electrodes, being different from the first type pixel electrodes, of the first pixel electrodes, and the third scanning signal line connected with only the gates of the second transistors connected with the second pixel electrodes,
wherein scanning signals have a high voltage for turning on the transistors, and a low voltage for turning off the transistors,
wherein the driver circuit outputs a first high voltage to the first scanning signal line and the second scanning signal line, and outputs a second high voltage to the third scanning signal line, and
wherein the second high voltage is higher than the first high voltage.

5. The display device according to claim 4,
wherein the first type pixel electrodes are red pixel electrodes on which filters that transmit only red light are formed and the second type pixel electrode are green pixel electrodes on which filters that transmit only green light are formed,
wherein the second pixel electrodes are blue pixel electrodes on which filters that transmit only blue light are formed and white pixel electrodes on which filters that transmit white light are formed, and
wherein the blue pixel electrodes and the white pixel electrodes are alternately arrayed along the same third scanning signal line.

6. The display device according to claim 4,
wherein the area of one of the second pixel electrodes is larger than the area of one of the first pixel electrodes by 20% or higher.

7. A display device, comprising:
a first substrate and a second substrate;
color filters that are disposed on the second substrate;
a plurality of scanning signal lines that is formed on the first substrate;
a plurality of image signal lines that intersects with the scanning signal lines, and is formed on the first substrate;
a driver circuit that applies a scanning signal to the scanning signal lines;
a plurality of pixels that is formed on the first substrate in a matrix;
transistors and pixel electrodes, at least one of the transistors and at least one of the electrodes are formed on each of the pixels; and
a gate, an input electrode, and an output electrode which are disposed in each of the transistors, in which the gate is connected to one of the plurality of scanning signal lines, the input electrode is connected to one of the plurality of image signal lines, and the output electrode-is connected to one of the plurality of pixel electrodes,
wherein the pixel electrodes include first pixel electrodes of first type electrodes and second type electrodes, and second pixel electrodes, and the second pixel electrodes are larger in area than the first pixel electrodes,
wherein the scanning signal lines include first scanning signal lines, second scanning signal lines, and third scanning signal lines,
wherein one of the first scanning signal lines forms a first capacitor in cooperation with one of the first type pixel electrodes,
wherein one of the second scanning signal lines forms a second capacitor in cooperation with one of the second type pixel electrodes,
wherein one of the third scanning signal lines forms a third capacitor in cooperation with one of the second pixel electrodes,
wherein the scanning signal has an amplitude between a high voltage for turning on the transistor and a low voltage for turning off the transistor, the low voltage lower than the high voltage,
wherein the driver circuit outputs a first scanning signal to the first scanning signal lines, outputs a second scanning signal to the second scanning signal lines, and outputs a third scanning signal to the third scanning signal lines, wherein transistors include first transistors connected with the first type pixel electrodes of the first pixel electrodes, and the second type pixel electrodes, being different from the first type pixel electrodes, of the first pixel electrodes, and second transistors connected with the second pixel electrodes, wherein the first scanning signal line connected with only the gates of the first transistors connected with the first type pixel electrodes, the second scanning signal line connected with only the gates of the first transistors connected with the second type pixel electrodes, and the third scanning line connected with only the gates of the second transistors, wherein the high voltage of the first scanning signal and the second scanning signal is lower than the high voltage of the third scanning signal.

8. The display device according to claim 7, wherein the color filters include:

a red filter that transmits a light of a red wavelength range;

a green filter that transmits a light of a green wavelength range;

a blue filter that transmits a light of a blue wavelength range; and a white filter that transmits a light of a white wavelength range;

wherein the first type pixel electrodes include red pixel electrodes facing the red filter, and the second type pixel electrode include green pixel electrodes facing the green filter, and wherein the second pixel electrodes include blue pixel electrodes facing the blue filter, and white pixel electrodes facing the white filter.

9. The display device according to claim 7, wherein the color filters include:

a red filter that transmits a light of a red wavelength range;

a green filter that transmits a light of a green wavelength range;

a blue filter that transmits a light of a blue wavelength range; and a white filter that transmits a light of a white wavelength range;

wherein the first type pixel electrodes include red pixel electrodes facing the red filters, and the second type pixel electrodes include green pixel electrodes facing the green filters, wherein the second pixel electrodes include blue pixel electrodes facing the blue filters, and white pixel electrodes facing the white filters, and wherein the blue pixel electrodes and the white pixel electrodes are alternately arrayed along the same scanning signal line.

10. The display device according to claim 7, wherein the area of one of the second pixel electrodes is larger than the area of one of the first pixel electrodes by 20% or higher.

* * * * *